US012415710B2

(12) United States Patent
Span et al.

(10) Patent No.: US 12,415,710 B2
(45) Date of Patent: Sep. 16, 2025

(54) COMPUTER-CONTROLLED MOBILE CRANE

(71) Applicant: TAJFUN LIV, PROIZVODNJA IN RAZVOJ D.O.O., Postojna (SI)

(72) Inventors: Iztok Span, Ljubljana (SI); Branko Gril, Prestranek (SI)

(73) Assignee: TAJFUN LIV, PROIZVODNJA IN RAZVOJ D.O.O. (SI)

( * ) Notice: Subject to any disclaimer, the term of this patent is extended or adjusted under 35 U.S.C. 154(b) by 493 days.

(21) Appl. No.: 17/906,721

(22) PCT Filed: Mar. 29, 2021

(86) PCT No.: PCT/SI2021/000003

§ 371 (c)(1),
(2) Date: Sep. 19, 2022

(87) PCT Pub. No.: WO2021/216006

PCT Pub. Date: Oct. 28, 2021

(65) Prior Publication Data

US 2023/0145087 A1 May 11, 2023

(30) Foreign Application Priority Data

Apr. 23, 2020 (SI) ................................ P-202000073

(51) Int. Cl.
*B66C 23/58* (2006.01)
*B66C 13/46* (2006.01)
(Continued)

(52) U.S. Cl.
CPC ............ *B66C 23/585* (2013.01); *B66C 13/46* (2013.01); *B66C 13/48* (2013.01); *B66C 23/42* (2013.01);
(Continued)

(58) Field of Classification Search
CPC ....... B66C 23/585; B66C 13/46; B66C 13/48; B66C 23/42; B66C 23/54; B66C 23/80; B66C 23/86; B66C 23/36
See application file for complete search history.

(56) References Cited

U.S. PATENT DOCUMENTS 3,557,967 A * 1/1971 Madole .................... B66C 3/20 212/300
2002/0175824 A1* 11/2002 Shaw ...................... B66C 13/46 340/685
(Continued)

FOREIGN PATENT DOCUMENTS

DK 2018 00157 A 10/2019
DK 201800157 A1 * 10/2019 ............ B66C 13/48
(Continued)

OTHER PUBLICATIONS

International Search Report and Written Opinion dated Jul. 12, 2021 issued in co-pending PCT Patent App. No. PCT/SI2021/000003 (15 pages).

*Primary Examiner* — Scott A Browne
*Assistant Examiner* — Izcalli Rios-Aguirre
(74) *Attorney, Agent, or Firm* — Haynes and Boone, LLP; William B. Nash; Brooke Parker

(57) ABSTRACT

A computer-controlled mobile crane is disclosed herein, comprising a column which is rotatable around its vertical axis, a hydraulically actuated primary arm, a hydraulically actuated secondary arm, and an attachment point to which a gripping assembly is attached. The components are actuated by a hydraulic control unit controlled by a computer control unit and corresponding software that generates an internal coordinate system on the basis sensors mounted on the crane and an optical measuring unit. The crane is capable of automatically using the gripping assembly to transport a load from an initial point to an end point where the load
(Continued)

should be deposited while avoiding one or more obstacles in the path of travel of the gripping assembly and the load.

14 Claims, 4 Drawing Sheets

(51) Int. Cl.

| | |
|---|---|
| ***B66C 13/48*** | (2006.01) |
| ***B66C 23/00*** | (2006.01) |
| ***B66C 23/42*** | (2006.01) |
| ***B66C 23/80*** | (2006.01) |
| ***B66C 23/86*** | (2006.01) |

(52) U.S. Cl.
CPC .............. *B66C 23/54* (2013.01); *B66C 23/80* (2013.01); *B66C 23/86* (2013.01)

(56) References Cited

U.S. PATENT DOCUMENTS

| | | | | |
|---|---|---|---|---|
| 2018/0273350 | A1* | 9/2018 | Steindl | B66C 3/20 |
| 2019/0177131 | A1* | 6/2019 | Palberg | B66C 13/40 |

FOREIGN PATENT DOCUMENTS

| | | | | |
|---|---|---|---|---|
| EP | 3099618 | B1 | 12/2016 | |
| EP | 3257805 | A1 * | 12/2017 | B66C 13/20 |
| EP | 3378823 | A1 | 9/2018 | |
| EP | 3553015 | A1 | 10/2019 | |
| EP | 3556709 | A1 | 10/2019 | |
| EP | 3556711 | A1 * | 10/2019 | B66C 13/04 |
| WO | WO 2015/021558 | A1 | 2/2015 | |

* cited by examiner

COMPUTER-CONTROLLED MOBILE CRANE

CROSS-REFERENCE TO RELATED APPLICATIONS

This application is a United States national phase application of co-pending international patent application number PCT/SI2021/000003, filed on Mar. 29, 2021, which claims the benefit of Slovenia Patent Application No. P-202000073, filed on Apr. 23, 2020, both which are hereby incorporated by reference in their entireties.

BACKGROUND

The present disclosure refers to a computer-controlled mobile crane, namely a crane, which is suitable for being installed on a truck and transported to each desired operation area together with said truck in order to perform, as soon as such vehicle is stopped, stabilized and secured against any further undesired displacing or overturning thereof, in situ loading of cargo in form of separate solid parts onto such vehicle, or also unloading the cargo from such vehicle in such state.

The purpose of the present disclosure is to create a computer-controlled mobile crane with previously mentioned features, which should enable gripping, transferring and deposition of each solid load either in the form of a single piece having consistent stiffness and shape, or also of a bundle of several such pieces, wherein each of them is consistent with regard to stiffness and shape thereof, wherein said load should be transferred from a defined initial point towards a defined end point, and each transferring of said load from said initial point towards each end point would have to be performed precisely and accurately, and in particularly also with the possibility of avoiding each potential collision with at least one obstacle, which may be defined within a coordinate system between said initial point and said end point.

Those skilled in the art are familiar with various cranes. One example of a crane is disclosed in EP 3 378 823 A1. Such crane comprises a column, which is rotatably around a vertical axis embedded on a platform, which is mountable on a motor vehicle, which is suitable for transporting of such crane together with each load, when available. Said platform is optionally furnished with at least two telescopic beams, which are arranged in a substantially horizontal plane and are expandable in a direction apart from each other, wherein each of them is on its free end portion equipped with a telescopic supporting leg, which extends and is expandable substantially in a direction towards the ground and may also be fixed in each desired position, so that it can serve as a support for said vehicle and also for crane in order to prevent it from overturning of said crane and also of said vehicle. In the terminal area of said column, a primary arm is attached pivotally around a horizontal geometric axis, while in the terminal area thereof, a secondary arm is attached to said primary arm, which can also be pivoted around a horizontal geometric axis relatively to said primary arm. In most cases, said secondary aim is telescopically conceived and consists of several tubular bearing sections, which are inserted into each other then and successively, one by another, movable along the longitudinal geometric axis of said secondary arm. The inner bearing section of the secondary arm is on its terminal area furnished with an attachment point, in which either a gripping assembly, for example a grabbing apparatus is attached, or a supplemental rotating unit, a so called rotator, on which then said grabbing apparatus is hung, which then allows properly controlled turning of said gripping appliance around its vertical geometric axis. Said primary arm is supported by a hydraulic cylinder, which is on the one hand attached to said column and on the other hand to the primary aim. Quite analogously, the secondary arm is supported by a hydraulic cylinder, which is on the one hand attached to the primary arm and on the other hand to the secondary arm. Said tubular sections on the secondary arm are also movable by means of suitable hydraulic driving means, and also said column and said rotator together with said gripping appliance may each be rotatable by means of associated hydraulic motors. Each required mechanical movements, namely either rotations around each geometric axis or translations along each geometric axis, are performed on the basis of controlled and pre-determined supplying of properly compressed hydraulic fluid towards each of said hydraulic driving appliances, or releasing of said hydraulic fluid there-from. Previously described features are typical for numerous modern mobile cranes, which can be found in the state of the art.

The crane according to EP 3 378 823 A1 is created with the aim to assure coordinated acting of said components, so that in a properly programmed mode of operation then in fact an automatized transferring of a load at a sufficient distance above the ground and also substantially parallel with each ground should be enabled, which could contribute to releasing of each operator from repeating of trivial actions, which however always require his absolute concentration. To this aim, such crane is in the area of both horizontal geometric axis, in which the primary arm is pivotable relatively to the column and the secondary arm is pivotable relatively to the primary arm, furnished with electronic units for measuring angles between the column and the primary arm, as well as between the primary and the secondary arm. By monitoring and changing said angles and by means of properly computerized unit for controlling supply of the hydraulic fluid towards each relevant driving units it is therefore possible to assure that a load is lifted from its initial position on the ground to each desired height i.e. on each desired level above the ground, along which said load is then by means of software at least approximately horizontally and at a safe distance apart the ground automatically transferred to each end point, where it is then released. Such approach may probably somehow simplify the tasks of the operator, but nevertheless still requires complete attention of the operator by initial gripping of the load, lifting on a desired level above the ground and also by lowering and releasing the load, which is then followed by returning back to initial position. Moreover, in practice it also happens that in the area of manipulation with each load various obstacles may occur either due to uneven ground or similar circumstances, which may be predictable or unpredictable. For example, when a disregarded or unexpected obstacle occurs along the path of transferring each load, or whenever the height of an obstacle is not accounted for, an inattentive crane operator may easily lead to collision either between the load and the obstacle, or even between the components of crane and the obstacle.

In another example, a system for automated displacing of crane arms is disclosed in EP 3 556 709 A1, in which in principle a mobile crane of previously described art is used, where in the area of each horizontal geometric axis, in which the primary arm is pivoted relatively to the column and the secondary arm is pivoted relatively to the primary arm, optionally however also on the terminal portion of an optionally telescopic extendable secondary arm, appropriate electronic units are available, which are suitable for detecting and/or determining of each position of the primary arm relatively to the column, of said secondary arm relatively to the primary arm, as well as of said telescopic terminal area of the secondary arm relatively to the secondary arm as such or relatively to the first arm. Each of these points is defined in a global coordinate system and also in local coordinate systems. In fact, it is a so-called open kinematic chain, consisting of rigid bearing members and driving means, which are used for displacing said rigid bearing members. By taking into account all data obtained from said electronic means in the area of said pivot points or guides on the column and arms a computerized support to controlling of the crane is performed in such manner that each data relating to paths, which were executed under control of the operator, is memorized in the computer, upon which the crane is capable of repeating sequences of movements along each known path by itself and as long as it is required. In accordance with such concept it is therefore possible to memorize the data about a plurality of various paths, which are known to the control unit and were memorized on the basis of previous instructions as given by the operator. By choosing each desired program, each stored action can be therefore repeated many times. However, contrary to the domain of robotics in industrial mass production, in practical exploitation of mobile cranes such situations, which would require at least occasionally or even permanently repeating of certain pattern, are quite rare. Particular situations by gripping, lifting, transferring, lowering and releasing of each particular load are namely changing and differ from each other at least to such extent that automatic repeating of one single step cannot be applied, since each subsequent load is picked-up from a different area as the previous load, and is also deposited to another place as the previous load before that. The disclosure above merely automates returning the grabbing apparatus back to its initial position, although even in such initial position there is no load anymore and each forthcoming load is available in another place as the previously transferred one. In addition to that, controlling of said kinematic chain on the basis of measuring of angles in the area of each pivot point between two relatively long rigid bearing members unavoidable leads to lack of preciseness and inaccuracy, in particular due to essential length of said bearing members, which is bound with tendency on largest possible operation area of the crane as such. For example, when controlling a 2.5 m long rigid bearing member, by measuring of the angle in the area of its first terminal portion, each measuring error in amount of 1° would reflect in an essential deviation of position of the opposite terminal portion for approximately 4-5 cm relative to the mathematically calculated position thereof. Along said kinematic chain consisting of two or three pivotally connected rigid bearing members, each errors may be summed, so potential errors may reach such values that in most critical situations such potential discrepancies could lead not only to questions about accuracy of transferring, but even to questions about practical feasibility of gripping each particular load, which is of course connected also with accurately determining each location of a particular load to be picked, along with where the load should then be deposited. Said problems of potential collision with an obstacle in the path of travel of the load, which could appear in the area of transferring each load or operation of the crane as such, as has been previously discussed also in this case remains practically the same and completely unsolved.

As another example, an analogous system for automated moving of crane arms is also disclosed in EP 3 556 711 A1. In this case a kinematic chain consists of rigid bearing members, which are pivotally connected with each other and displaceable relatively to each other by means of driving apparatus, wherein their position relatively to each other and also the position of each member in a coordinate system can be determined, monitored and controlled by means of sensors for determining of angle between each neighboring rigid members, which means between two arms of a mobile crane. The proposed concept should enable automatic guiding among particular points within the space, however under condition, that each of said points is furnished with an emitting probe, which suitable for communication with a control unit, which controls the driving means and moves each desired components of said kinematic chain in such way that they are directed towards a desired emitting probe or along a path between two emitting probes. This requires that each initial point, where certain load is located before transferring thereof, and also each end point, to which said load should be transported and then deposited, must be furnished with such emitting probe before operation, which is not only time consuming but is in most cases also unfeasible. Mounting of such emitting probe on the one hand on a load and on the other hand also on a place, where the load should be deposited, and avoiding each risk to either damage or even destroy such emitting probe, is impracticable. Mobile cranes are namely used for operation in situ and in various circumstances, so that weather conditions, risks of physical damage, and potential electromagnetic influences of other devices including just masking by other objects and other potential disturbances may adversely impact on reliability during long-term professional use, in particular where several emitting probes need to be used. It should be born in mind that an error just one of each disposable emitting probes unavoidably leads to situation where said control unit may assume a false configuration of the complete working area, which may then lead to irregular and unpredictable operation of the crane. As with other cranes known in the art, in this case said problem of potential collision with an obstacle, which could appear in the area of transferring each load between the initial point and the end point, i.e. between two emitting probes, also in this case remains practically the same and completely unsolved.

As another example, a crane and method for controlling such crane are disclosed in EP 3 553 015 A1 on the basis of DK 2018 00157 A. The disclosed crane is mountable onto a truck and is suitable for loading or unloading of loads in form of solid objects. The concept of controlling of the crane during its operation is however different. A control unit memorizes typical configurations of the crane, namely position of the column, for example by gripping the load when placed onto a truck, by lifted load during transferring the load as well as the position by depositing the load onto each ground adjacent to the vehicle. Consequently, by choosing certain commands, such crane can then be transformed from one of its position into another one, which should lead to much easier manipulation with the crane. In addition, the disclosed crane is furnished with cameras, which during operation may detect an obstacle, which may be present within the visible area of each camera. Again, such approach appears to be feasible in some cases, where certain actions of the crane are just repeated, for example by distribution and delivery of particle loads, which might be loaded in a storehouse and then distributed to another location, where the load is then unloaded and deposited. Operation might be automatically interrupted if an obstacle appears to be present within the visible area of cameras, but this requires software as used for supporting the said cameras which is able to recognize such obstacle in a very short time period and to interrupt immediately any further operation of the crane. Furthermore, exploitation of such crane for the purpose of transferring each load from a randomly chosen initial point towards another randomly chosen end point would require computer storage of an enormous quantity of various potential configurations of the crane, so that just selecting among suitable configurations would be much more complicated and time consuming than simply using a common human operated crane.

SUMMARY

The present disclosure describes various embodiments of a computer-controlled mobile crane. Such crane generally comprises a column, which is on its terminal portion, which is faced towards the ground, and may rotate around a vertical geometric axis by a rotational hydraulic driving apparatus mounted on a suitable platform, which is mountable onto a motor vehicle, which may be suitable for transporting of such crane together with cargo.

The crane disclosed herein may be furnished with suitable supporting means for maintaining said vehicle in a substantially unchanging position during its operation, as well as for preventing said crane and also said vehicle from being overturned during operation. To this aim, said platform may be optionally furnished with at least two protruding telescopic beams, which may be substantially in a horizontal plane arranged and apart from each other, wherein each of said beams is on its free terminal portion equipped with an at least approximately vertical telescopic supporting leg, which is via hydraulic conduits connected with a control unit of a hydraulic unit of the crane and is movable towards the ground, but can also be blocked in a desired position.

In some embodiments, on the opposite free terminal portion of said rotatable crane column of said crane, a primary arm is attached thereto by its first terminal portion, and is pivotally around a horizontal geometric axis, wherein on the other i.e. opposite terminal portion of said primary arm a secondary arm is attached by its first terminal portion to said primary arm, wherein said secondary arm is also pivotal around a horizontal geometric axis relatively to said primary arm and is on its residual free terminal portion furnished with an attachment point, which is suitable for attachment of a movable gripping assembly on said terminal portion of the secondary arm.

Said primary arm may be supported by at least one driving means, for example a hydraulic cylinder, which is on the one end attached to the column and on the other end to said primary arm, wherein said cylinder is also via suitable hydraulic conduits connected with said control unit of a hydraulic unit of the crane. Analogously, also said secondary arm is on said primary arm supported by at least one hydraulic driving means, for example a hydraulic cylinder, which is on the one end attached to primary arm and on the other end to said secondary arm, wherein said cylinder is also via suitable hydraulic conduits connected with said control unit of a hydraulic unit of the crane. Said secondary arm may optionally be of a telescoping structure and may be formed of several tubular bearing sections, which are inserted within each other and are by means of a suitable hydraulic driving means, which may also via corresponding conduits connected with said control unit of said hydraulic unit of the crane, one by another movable along the longitudinal geometric axis of the secondary arm, wherein in such case the attachment point may be located on the outwardly protruding terminal portion of the inner tubular bearing section of such telescopic secondary arm. A hydraulic unit is optionally applied between said attachment point on the free terminal portion of the secondary arm and a gripping assembly, wherein such hydraulic unit may comprise a rotational hydraulic motor and may be also via suitable hydraulic conduits connected with said control unit of a hydraulic unit of the crane, in order to enable controlled and predictable rotation of said gripping assembly.

Based on the present disclosure, required movements of the disclosed mobile crane, either turning of the column, primary arm, secondary arm, or gripping assembly, around each corresponding axis, and/or linear movements of tubular bearing sections along the longitudinal axis of the secondary arm are performed on the basis of controlled application of a required quantity of hydraulic fluid from the hydraulic unit to each corresponding driving apparatus, or by releasing of a pre-determined quantity of hydraulic fluid from each of said driving means.

In some embodiments, the crane described herein may be furnished with a computer control unit, which may be powered either by an electric source on a motor vehicle, or by another electric energy source. Said computer control unit may be connected to a dedicated optical measuring unit, which is able to generate an optically recognizable light beam or at least optically recognizable point, which is marked by said light beam on each measured surface. Through employing said optical measuring unit, said computer control unit is capable of generating and maintaining a coordinate system in which the crane is located. Said optical measuring unit is interactively connected with said computer control unit and is suitable for determining of each distance between said optical measuring unit and a marked reference point on the basis of each position and orientation of said optical measuring unit within said coordinate system, so that on the basis of a measured distance between said optical measuring unit and each marked reference point also the coordinates of each marked reference point are determined.

In various embodiments, said optical measuring unit can either be fixed on a pre-determined and unchangeable location on the crane, or may also be available as a portable unit, which is however during its operation connected with said computer control unit and is able to communicate therewith, wherein the position and orientation of said optical measuring unit within the coordinate system is always exactly defined.

In some embodiments, said computer control unit may be connected

- with a sensor for detecting the rotational position of the column s around its vertical geometric axis within said coordinate system,
- with a sensor for detecting linear displacement of a hydraulic driving apparatus and therefore indirectly also for controlling motion of the primary arm by means of a hydraulic cylinder around its corresponding geometric axis and relative to said column within the coordinate system,
- with a sensor for detecting linear displacement of a hydraulic driving apparatus and therefore indirectly also for controlling motion of the secondary arm by means of a hydraulic cylinder around its corresponding geometric axis and relative to said primary arm within the coordinate system,
- and optionally, when the crane is furnished with tubular bearing sections on the secondary arm capable of being inserted within each other, with a sensor, which is capable to detect the extension of the secondary arm along its longitudinal axis within the coordinate system, and optionally also, when the crane is furnished with a rotating unit attached at the terminal end of the secondary arm, with a sensor for detecting the position of a gripping assembly, which may be attached to said rotating unit, within the coordinate system.

In some embodiments, the crane including said computer control unit may be adapted to operate by software which may be stored on an electronic storage medium located within the computer control unit, which may be capable to generate and use said coordinate system within which the crane is located, to transfer loads from a desired initial point towards to a desired end point, and may be capable of executing the following steps, in no particular order:

i) calculating coordinates of an initial point within said coordinate system on the basis of data related to position of said optical measuring unit in relation to the initial point, as well as the data about the distance between said between said initial point and the optical measuring unit, ii) calculating coordinates of an end point within said coordinate system on the basis of data related to position of said optical measuring unit, in relation to the end point, as well as the data about the distance between said between said end point and the optical measuring unit, iii) calculating coordinates of at least one intermediate point on an obstacle located within an operating area of the crane and within said coordinate system on the basis of data related to position of said optical measuring unit, as well as the data about the distance between said between said point on the obstacle and the optical measuring unit, iv) determining a position of said column, primary arm, secondary arm, and attachment point and said gripping apparatus within said coordinate system on the basis of data, which may be retrieved from relevant sensors disclosed herein, v) determining the rotation of the column and the linear displacement of hydraulic cylinders for the purposes of moving said primary and secondary arm, and optionally also linear displacement of telescopic tubular bearing sections on the secondary arm, and optionally also the rotation of the hydraulic motor in the rotation unit, if equipped, and which may lead to movement of the gripping assembly from a prior position to the initial point, wherein also it may also be checked, if a potential obstacle is located between said prior position of the gripping assembly and said initial point, so that in such case said obstacle is safely avoided at suitable distances within the coordinate system axis, vi) determining the necessary rotation or operation of the hydraulic motor associated with the movement of the column and hydraulic cylinders for the purposes of moving said primary and secondary arm and optionally also extension or retraction in telescopic tubular bearing sections on the secondary arm, as well as required rotation of a hydraulic motor in the rotation unit, if available, which may be gathered based on data as processed in the steps disclosed herein, and then may result in movement of the gripping assembly from an initial point to an end point, wherein it is also checked, if each potential obstacle is located between said initial point and each selected end point, so that in such case said obstacle is safely avoided at suitable distances along each coordinate system axis, vii) displaying a suitable information about conclusion of calculations of all required rotations of said hydraulic motors and movements of said hydraulic cylinders, which are required for transferring said gripping assembly from a prior, or inactive, position towards the initial point and then also from each selected initial point to each selected end point by simultaneously avoiding said obstacle within said coordinate system axis, and then waiting for approval and command for starting operations as expected from a user, viii) upon receiving said command for starting operations from a user, controlling operation of a hydraulic control unit of the hydraulic unit, which then controls supplying of hydraulic fluid as needed to each of said hydraulic driving apparatus and consequently each required movement of said column, said primary secondary arms, and optionally, said telescopic extension of the secondary arm and rotation of the gripping assembly for the purpose of gripping and lifting each load from the initial point and then transferring said load towards the end point by simultaneously avoiding of collision with at least one obstacle at suitable distance therefrom, ix) displaying information by said computer control unit to a user that a task is completed and providing information about a next selected initial point, end point and at least one obstacle by using said optical measuring unit, x) repeating the steps foregoing steps by the computer control unit.

In some embodiments, the computer control unit of the crane may be optionally switched-off an removed from controlling said crane, upon which controlling of said hydraulic control unit in the hydraulic unit may be accomplished by means of manual controls or by means of any other control system which is suitable for controlling such crane.

In some embodiment, the computer control unit may be furnished with such software capable of determining each current position of said crane components, namely of said column, said primary and secondary arms, as well as of said gripping assembly on the basis of automatically assuming the last previously known position of said components, before each subsequent initial point, end point and potential obstacle are defined.

In a further embodiment of a crane, said optical measuring unit and said computer control unit are able to operate on the basis of a presumption that marking just one point on an obstacle actually means marking of the highest point. For example, the optical measuring unit and computer control unit may analyze a peak or point of said obstacle, which may be presumed to be a square pyramid, the height of which corresponds to the width of a square in a horizontal plane of the coordinate system.

In a still further embodiment, said optical measuring unit and said computer control unit are able to operate on the basis of a presumption that marking of two points on an obstacle actually means defining a line between two points, which corresponds to a top edge of said obstacle, which is then presumed to be a wedge-like body with a rectangular base plane and triangular profile, wherein the shorter dimension of such assumed rectangular base is equal to the height of said body and the longer dimension thereof is equal to the distance between said two marked points.

In a still further embodiment, said optical measuring unit and said computer control unit are suitable for defining of more than one obstacle and marking of a plurality of points, which each per se belong to each particular obstacle.

In addition to the previously mentioned features, in some embodiments the crane may also comprise a camera, which is available in the area above the gripping assembly and is together with said optical measuring unit and said computer control unit adapted for operation in accordance with principles of computer vision, in particular for recognition or identification of objects including recognition of orientation of each load which is to be transferred. Consequently, by using each data as retrieved from said camera, said computer control unit may be able to control, via said hydraulic control unit of the hydraulic unit operation, each desired operation of said gripping assembly, which means both controlling of rotation thereof around its vertical geometric axis as well as gripping or releasing of each transferred load.

In some embodiments the said coordinate system may be an orthogonal coordinate system. However said computer control unit for controlling said crane may also suitable for operating in any other type of coordinate system. In some embodiments the coordinates in such other type of coordinate system may be mathematically transformable into coordinates of an orthogonal coordinate system, or vice versa. For example, based on environmental or operational situations it may be optimal and sometimes quite useful if said computer control unit for controlling said crane is suitable for operating in a cylindrical coordinate system.

DETAILED DESCRIPTION

Figure 1:
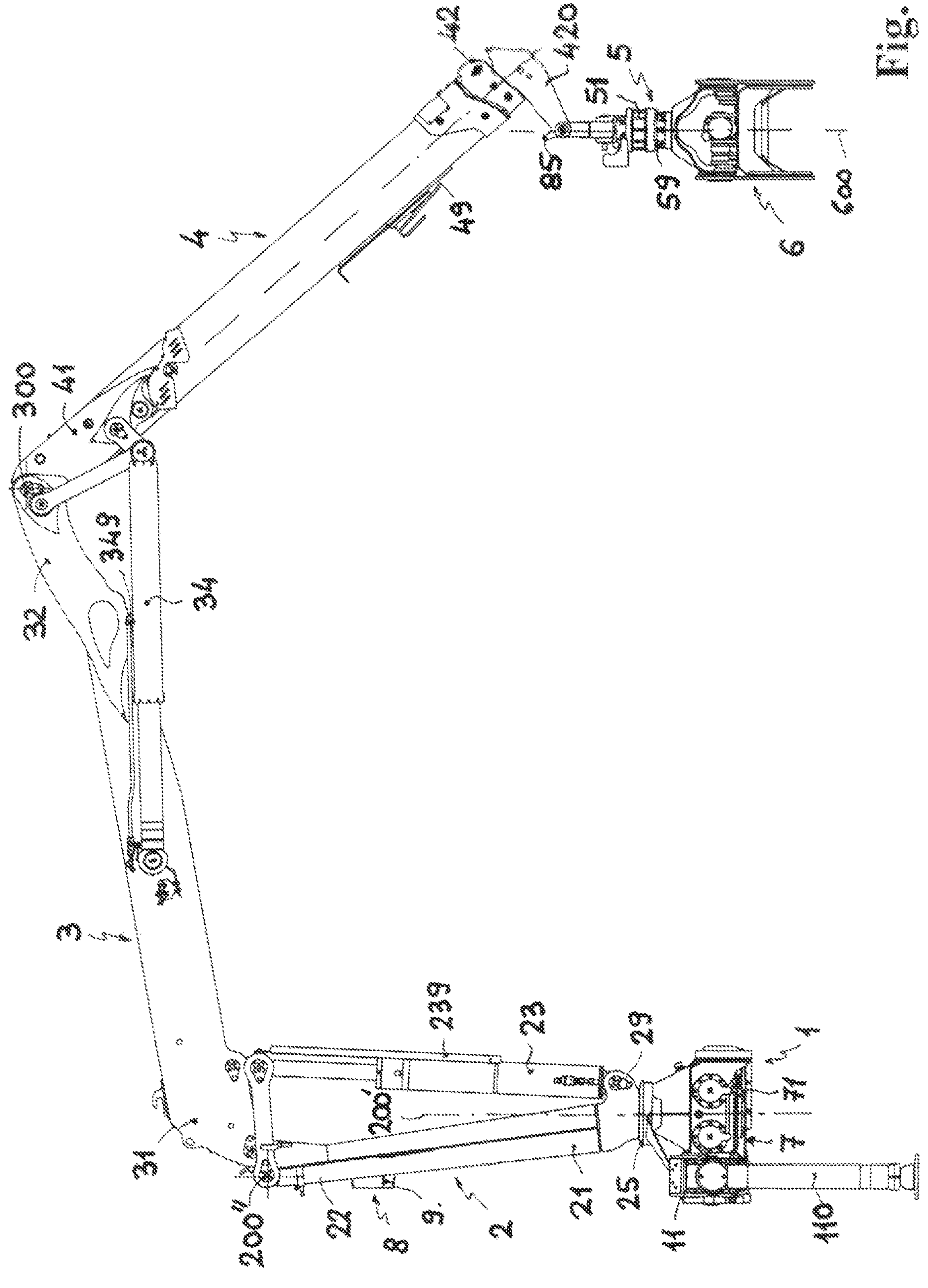
FIG. 1 is a side elevation view of an embodiment of a computer-controlled mobile crane.

Embodiments of a computer-controlled mobile crane are disclosed according to FIGS. 1-4 and comprises a column 2, which is on its terminal portion 21, which may be oriented downward or towards the ground. A rotational hydraulic driving apparatus 25 may rotate column 2 around a vertical geometric axis 200' which is anchored to a platform 1. Platform 1 may be part of aa motor vehicle, which may be suitable for transporting of such crane together with cargo, when available. Said crane according to FIGS. 1-4 is shown with a gripping assembly 6 suitable for use in forestry, which may suitable for manipulating of timbers. Persons of skill in the art however will recognize generally that the embodiment shown is merely one of many possibilities regarding potential use thereof and should not limit the scope of the invention as such, since such crane is no doubt also suitable for manipulating with cargo of various other kinds.

The disclosed crane may be furnished with suitable supporting means for maintaining said crane in a substantially unchanging position during its operation as well as for preventing said crane and any apparatus to which said crane may be mounted from being overturned. In the embodiments shown in FIGS. 1-4 said platform 1 is furnished with at least two horizontally arranged protruding telescopic beams 11, 12, with each of them is on their free terminal portion equipped with vertical telescopic supporting leg 110, 120 as shown in FIG. 3. Supporting legs 110, 120 may be via hydraulic conduits connected with a control unit 71 of a hydraulic unit 7 of the crane and may be extendable towards the ground, but may also be capable of extended to any desired position, so that each leg may serve as a support for both the crane and any apparatus to which said crane may be mounted, to prevent the crane and the vehicle against overturning. Persons skilled in the art should also understand that supporting and stabilizing of the crane during its operation might also be assured by other measures like mounting of such supporting legs directly to a vehicle chassis, or to any other parts either of a vehicle or of a crane, or separately, for example on the one hand to a crane and on the other hand to a vehicle.

In the embodiments in the accompanying FIGS. 1-4, on the residual terminal portion 22 of said rotatable column 2 of said crane there is a primary arm 3, which is coupled there-to by its first terminal portion 31 and is pivotal around a horizontal geometric axis 200", while on the opposite terminal portion 32 of said primary arm 3, a secondary arm 4 is coupled to said primary arm 3 by its first terminal portion 41 to said primary arm 3. Said secondary arm 4 is also pivotal around a horizontal geometric axis 300 relatively to said primary arm 3.

Said secondary arm 4 is on its another free terminal portion 42 furnished with an attachment point 420, which may be suitable for attachment of a moveable gripping assembly 6 on said terminal portion 42 of the secondary arm 4. In the shown embodiment said gripping assembly 6 is pivotally attached to said attachment point 420.

Said primary arm 3 is in each position thereof supported by at least one driving means, in these embodiments a hydraulic cylinder 23, which is on the one hand attached to the column 2 and on the other hand to said primary arm 3, wherein said cylinder 23 is via suitable hydraulic conduits connected with said control unit 71 of a hydraulic unit 7 of the crane, and is such supplied with hydraulic fluid, by which pivoting of the primary arm 3 around the horizontal geometric axis 200" and relative to the column 2 is performed.

Similarly, said secondary arm 4 is on said primary arm 3 supported by at least one hydraulic driving means, namely a hydraulic cylinder 34, which is on the one hand attached to primary arm 3, and on the other hand to said secondary arm 4, wherein said cylinder 34 is also via suitable hydraulic conduits connected with said control unit 71 of a hydraulic unit 7 of the crane, and is therefore supplied by hydraulic fluid and then may be correspondingly pivoted around the horizontal geometric axis 300 and relative to said primary arm 3. In FIG. 3, said secondary arm 4 is supported by two parallel and apart from each other spaced cylinders 34.

Figure 2:
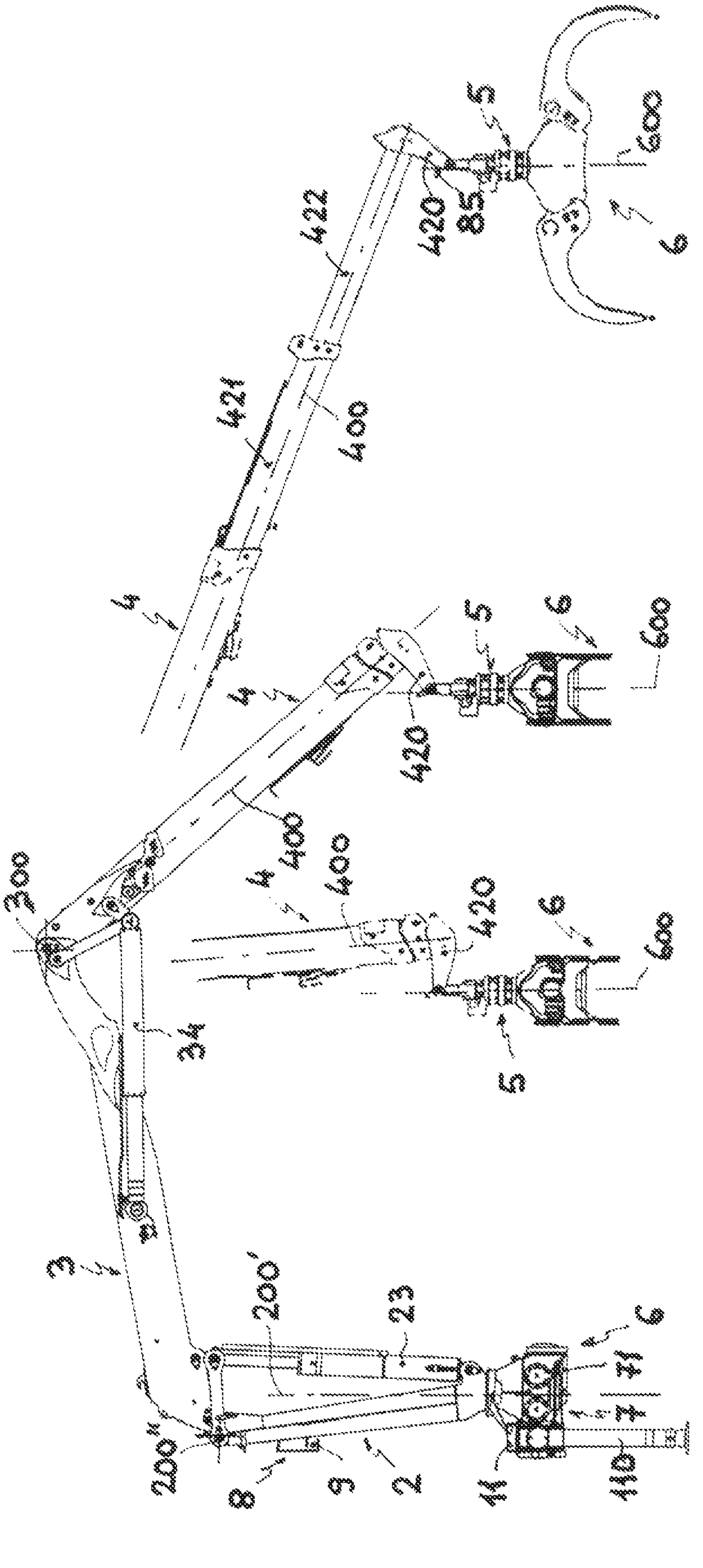
FIG. 2 is a side elevation view of an embodiment of a computer-controlled mobile crane according to FIG. 1, showing three different positions of its operational arms and its gripping assembly during operation.
Figure 3:
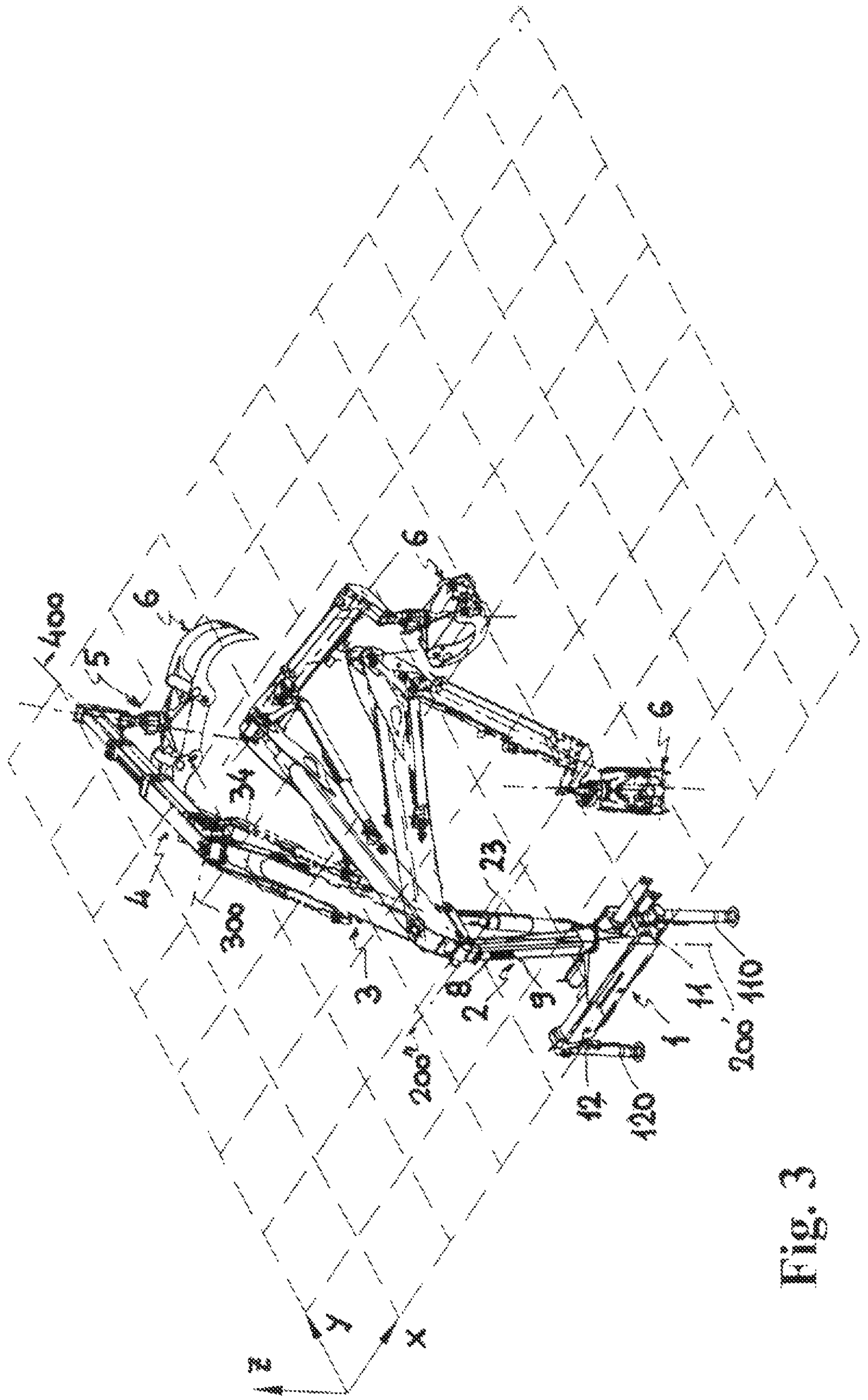
FIG. 3 is a perspective view of an embodiment of a computer-controlled mobile crane according to FIG. 1, showing three different positions of its operational arms and its gripping assembly during operation, and showing the crane in an orthogonal coordinate system.

In FIG. 2, said secondary arm 4 may optionally be telescopically conceived and is in such case formed of several concentric bearing sections 421, 422, which are inserted within each other and are by means of a suitable hydraulic driving means, which may also via corresponding conduits connected with said control unit 71 of said hydraulic unit 7 of the crane, successively and one by another movable along the longitudinal geometric axis 400 of the secondary arm 4. In such telescopic embodiment of the secondary arm 4, attachment point 420 for connecting said gripping assembly 6 may be located on the outwardly protruding terminal portion of the inner tubular bearing section 422 of such telescopic secondary arm 4.

In FIGS. 1-4, a hydraulic rotation unit 5 is foreseen, which is located between said attachment point 420 on the free terminal portion 42 of the secondary arm 4 and said gripping assembly 6, wherein such rotation unit comprises a rotational hydraulic motor 51 and enables predictable and remotely performed controlling of said gripping assembly 6 by rotating around its vertical geometric axis 600. When manipulating relatively long pieces of cargo, such as timbers, or girders, use of hydraulic rotation unit 5 may be required for the purpose of achieving sufficiently effective manipulation with the crane. In other circumstances with other types of cargo, where orientation of said gripping assembly is not very important, an embodiment of the crane disclosed herein may not include said rotating unit 5.

Whenever such rotation unit 5 is present in an embodiment, it may also via suitable hydraulic conduits connected with said control unit 71 of a hydraulic unit 7 of the crane, which is required in order to enable controlled and predictable rotation of said gripping assembly 6 around its vertical geometric axis 600.

In FIGS. 1-4, required movements of the crane, either turning of said column 2, said primary arm 3, said secondary arm 4 or said gripping assembly 6 around each corresponding axis 200', 200", 300, 600 and/or linear movements of tubular bearing sections 421, 422 on a telescopic secondary arm 4 along the longitudinal axis 400 thereof may be performed on the basis of controlled and pre-determined supplying of each required quantity of hydraulic fluid from the hydraulic unit 7 via said hydraulic control unit 71 to each corresponding driving means 23, 25, 34, 51, or substantially also by releasing of a pre-determined quantity of hydraulic fluid from each of said driving means 23, 25, 34, 51.

Said computer-controlled crane shown in FIGS. 1-4 further comprises a computer control unit 8, which may be powered either by an electric source on a motor vehicle on which said crane is mounted, or by another electric energy source.

Said computer control unit 8 is capable, in situ and as soon as the crane is stabilized and ready for operation, to establish as well as to maintain a coordinate system x, y, z, in which the crane is located. In the embodiments according to FIGS. 3-4, it is an orthogonal coordinate system, which is however just one of several possible types of coordinate systems. This then also means that once the crane it stabilized and ready for operation, if the crane is properly supported and assured against each movement, a coordinate system is established that includes the complete physical operational range surrounding the crane, the coordinate system includes said crane including its vital components enabling operation thereof, any load(s), and also potential obstacles, which could have some impact either to safety of the crane as such, or also to safety and efficiently of manipulating said load(s).

Said computer control unit 8 exchanges signals with an optical measuring unit 9, which may be a unit with an optically recognizable light beam, including for example optically recognizable points $T_1$, $T_2$, $T_0$, which can be marked by said light beam on each measured surface. Optical measuring unit 9 may be oriented in various directions and towards each desired point of reference, wherein thanks to said visual recognition of the beam light, each illuminated or colored point on a surface can be recognized, by which also the distance of such point from said optical measuring unit 9 can be measured, upon which the retrieved data is forwarded or transmitted to the computer control unit 8. Said optical measuring unit 9 is therefore connected with said computer control unit 8 and is suitable for determining of each distance between said optical measuring unit 9 and reference points, for example reference points $T_1$, $T_2$, $T_0$, on the basis of each position and orientation of said optical measuring unit 9 within said coordinate system x, y, z, since a light source and also a direction of said light beam are exactly defined in coordinate system x, y, z.

In one of the embodiments in FIGS. 1-3, said optical measuring unit 9 is fixed on a pre-determined and unchangeable location on the crane itself. In another embodiment shown in FIG. 4, said optical measuring unit 9 is available as a portable device, which during its operation communicate with said computer control unit 8 in such manner that each position and orientation of said optical measuring unit 9 within the coordinate system x, y, z, and therefore also the source and direction of the light beam generated there-with, are in each moment exactly determined. Optical measuring unit 9 and computer control unit 8 may communicate wirelessly, for example via near-field communication or Bluetooth™, or may communicate via a connecting wire cable, or through an additional electromagnetic means. As a consequence, by marking each of said points $T_1$, $T_2$, $T_0$ and by knowing each position and orientation of said optical measuring unit 9, i.e. position of the light beam source and direction of the beam, and by determining angles between each coordinate axis x, y, z and said light beam from said optical measuring unit 9, and also by knowing each distance between said optical measuring unit 9 and each points $T_1$, $T_2$, $T_0$, coordinates of each selected point $T_1$, $T_2$, $T_0$ can then be easily determined with mathematical accuracy.

In some embodiments, and as shown in the FIGS. 1-4, in order to effectively control said crane, said computer control unit 8 may be electrically connected with and transmit signals to and from at least

- with a sensor 29 for detecting of position of the column 2 in the view of rotating column 2 by means of said hydraulic driving means 25 around its vertical geometric axis 200' relative to a pre-defined coordinate system x, y, z,
- with a sensor 239 for detecting displacement of a hydraulic driving means 23, and therefore indirectly also for controlling of pivoting of the primary arm 3 by means of a hydraulic cylinder serving as its driving means 23, around its corresponding horizontal geometric axis 200" and relative to said column 2 within the pre-defined coordinate system x, y, z,
- with a sensor 349 for detecting linear displacement of a hydraulic driving means 34 and therefore indirectly also for controlling of pivoting of the secondary arm 4 by means of a hydraulic cylinder serving as its driving means 34, around its corresponding geometric axis 300 and relative to said primary arm 3 within the pre-defined coordinate system x, y, z,
- and optionally, when the crane is furnished with telescopically extendable bearing sections 421, 422 on the secondary arm 4, as inserted within each other, with a sensor 49, which is capable to detect a position of the attachment point 420 on the bearing section 422 within pre-defined coordinate system x, y, z,
- and also optionally, when the crane is furnished with a rotating unit 5, with a sensor 59 for detecting a position of the gripping assembly 5, which is attached to said rotating unit 5, within said pre-defined coordinate system x, y, z.

Figure 4:
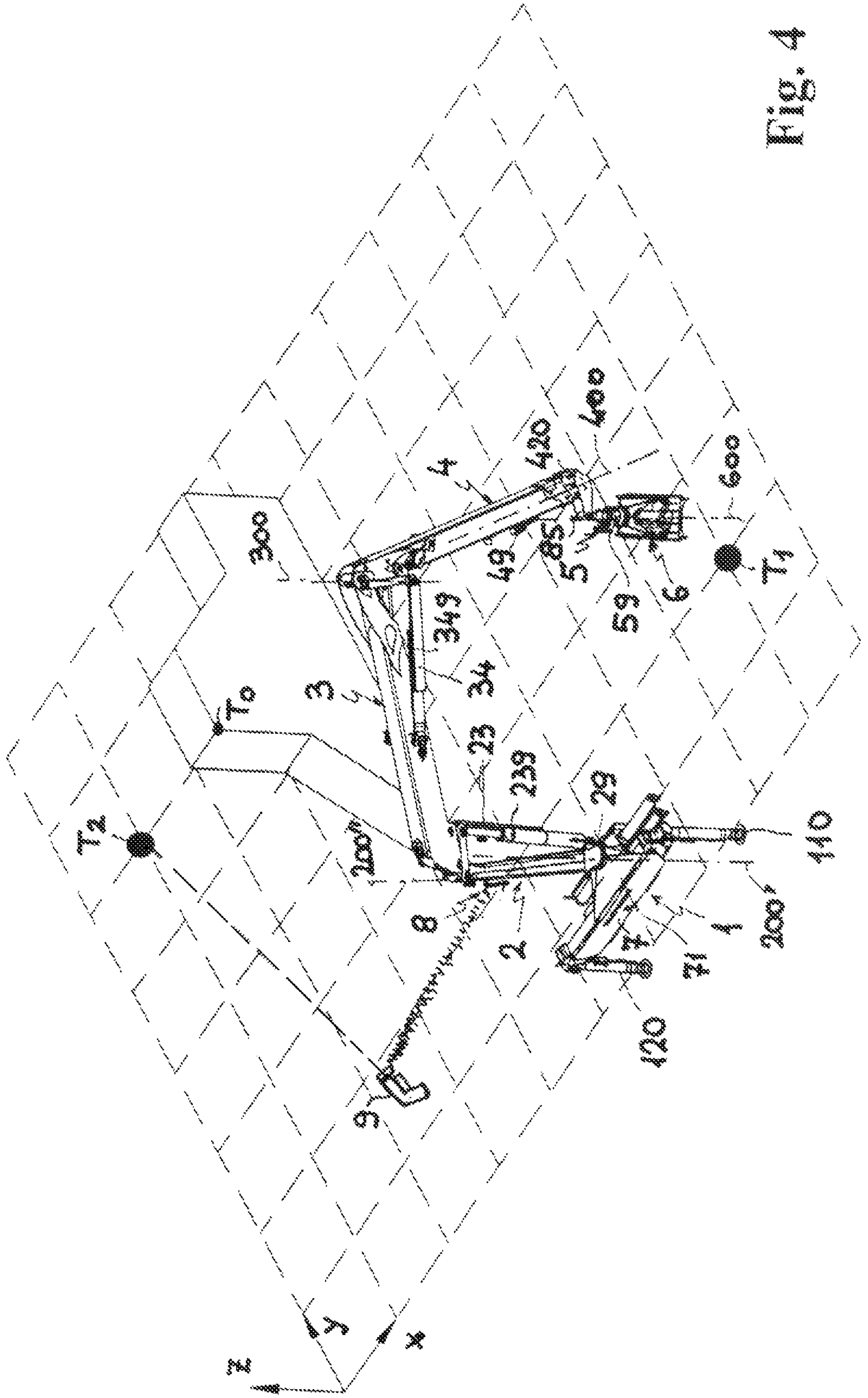
FIG. 4 is a perspective view of an embodiment of a computer-controlled mobile crane, within a spatial area as defined by an orthogonal coordinate system, showing an exemplary method of controlling the crane along a predetermined path from an initial point towards an end point and by taking into consideration at least one obstacle.

Referring to FIG. 4, said computer control unit 8 may be adapted to operate by means of software, which is capable of computing a coordinate system x, y, z, within which the crane is located, and transferring of each load from a desired initial point $T_1$ towards a desired end point $T_2$. Said software may be capable of executing the following steps, either in order of their presentation below or in a different sequence:

i) calculating of coordinates $x_1$, $y_1$, $z_1$ of the initial point $T_1$ within said coordinate system x, y z on the basis of data related to current position of said optical measuring unit 9, when directed towards the initial point $T_1$, as well as the data about the distance between said between said initial point $T_1$ and the optical measuring unit 9;

ii) calculating of coordinates $x_2$, $y_2$, $z_2$ of the end point $T_2$ within said coordinate system x, y z on the basis of data related to current position of said optical measuring unit 9, when directed towards the end point $T_2$, as well as the data about the distance between said between said end point $T_2$ and the optical measuring unit 9;

iii) calculating of coordinates $x_0$, $y_0$, $z_0$ of at least one intermediate point $T_0$ on an obstacle located within the operating area of the crane and within said coordinate system x, y z on the basis of data related to current position of said optical measuring unit 9, when directed towards said point $T_0$ on the obstacle, as well as the data about the distance between said between said point $T_0$ and the optical measuring unit 9;

iv) determining current position of said column 2, primary arm 3, secondary arm 4, attachment point 420 and said gripping appliance 6 within said coordinate system x, y, z on the basis of data, which may be retrieved from the corresponding sensors 29, 239, 349, 49, 59;

v) determining of necessary rotation of the hydraulic motor 25 of the column 2 and linear displacements in cylinders 23, 34 for the purposes of pivoting said primary arm 3 and secondary arm 4 around each associated axis 200" and 300, and optionally also linear displacement in telescopic bearing sections 421, 422 on the secondary arm 4 as well as required rotation of the hydraulic motor 51 in the rotation unit 5, if equipped, which may be performed on the basis of data as processed in steps disclosed herein, and then may lead to displacing of the gripping assembly from an initial, prior, or inactive position towards the initial point $T_1$, wherein it is also checked, if each potential obstacle $T_0$ is located between said initial, prior, or inactive position of the gripping assembly 6 and said initial point $T_1$, so that in such case said obstacle is safely avoided at suitable distances within coordinate system axis x, y, z;

vi) determining of each necessary rotation of the hydraulic motor 25 of the column 2 and linear displacements in cylinders 23, 34 for the purposes of pivoting said primary and secondary arm 2, 3 around each associated axis 200", 300, and optionally also linear displacements in telescopic bearing sections 421, 422 on the secondary arm 4 as well as required rotation of the hydraulic motor 51 in the rotation unit 5, if equipped, which may be performed on the basis of data as processed in steps disclosed herein, and then may lead to displacing of the gripping assembly from initial point $T_1$ to end point $T_2$, wherein it is also checked, if each potential obstacle $T_0$ is located between said initial point $T_1$ and end point $T_2$, so that in such case said obstacle is safely avoided at suitable distances along within coordinate system axis x, y, z;

vii) displaying a suitable information about conclusion of calculations of all required rotations of said hydraulic motors 25, 51 and movements of said cylinders 24, 34, which are required for transferring said gripping assembly 6 from its inactive position towards the initial point $T_1$ and then also from each selected initial point $T_1$ to each selected end point $T_2$ by simultaneously avoiding said obstacle $T_0$ within said coordinate system axis x, y, z, and then waiting for approval and command for starting operations as expected from a user;

viii) upon receiving said command for starting operations from the side of the operator, executing command within said computer control unit 8, which then starts controlling operation of said hydraulic control unit 71 of the hydraulic unit 7, which then controls supplying of hydraulic fluid to each of said hydraulic driving means 25, 23, 34, 51 and consequently each required rotations of said column 2, said primary secondary arms 3, 4, and optionally, also said telescopic extension of the secondary arm 4 and rotation and operation of the gripping assembly 6 for the purpose of gripping and lifting each load from the initial point $T_1$ and then transferring said load towards the end point $T_2$, while simultaneously avoiding collision with at least one obstacle $T_0$ at suitable distance therefrom;

ix) displaying information by said computer control unit 8 to a user that the task is completed and displaying additional further information associated with a next selected initial point $T_1$, end point $T_2$ and at least one obstacle $T_0$ by using said optical measuring unit 9, upon which the computer control unit 8 may be ready to repeat the steps disclosed herein, namely performing a movement of the gripping assembly 6 towards the initial point $T_1$ and then transferring each load from said initial point towards the end point $T_2$.

Said computer control unit 8 may optionally be deactivated and eliminated from controlling said crane, upon which controlling of said hydraulic control unit 71 in the hydraulic unit 7 may be feasible either by means of manual controls or by means of any other control system, which is suitable for controlling such crane. It is namely no doubt clear to each person skilled in the art that various cranes may be controlled by means of manual handles and by shifting hydraulic valves or control valves in a hydraulic control unit 71 there-with, or by modern cranes also by means of a control stick, a so-called joystick. Consequently, the crane according to the present disclosure may still be controlled by manual means.

In an embodiment of the crane according to the present disclosure, said computer control unit 8 is furnished with such software, which may be capable to determine a current position of said crane components, including said column 2, said primary arm 3, secondary arm 4, as well as of said gripping assembly 6, on the basis of assuming the last previously known position of said components within the said coordinate system, but before each subsequent initial point $T_1$, end point $T_2$ and potential obstacle $T_0$ are defined. Such approach may be useful in a pre-programmed mode of operation of the crane, which may be used in a repeating and successive transferring of a plurality of loads without interruptions and by anticipating that the crane as such is perfectly stable and the coordinate system is deemed to be maintained all the time.

To define one or more obstacles $T_o$ within an operational area of the crane, in some embodiments of the present disclosure said optical measuring unit 9 and said computer control unit 8 are able to operate on the basis of a presumption that marking just one point $T_o$ with coordinates $x_o$, $y_o$, $z_o$ on an obstacle actually means marking of the highest point on the obstacle, for example a peak of said obstacle, which may be presumed to be a square pyramid or a cone, which could for example represent a pile of earth, gravel, or construction debris, with the height $z_0$ which may correspond to the width of square in a horizontal plane x-y of the coordinate system x, y, z. A suitable distance between the gripping assembly 6 along or over said obstacle during transferring of a load may be determined in advance, and may be either incorporated within the programming of said software, or particular circumstances may allow for manual user input.

In another embodiment, said optical measuring unit 9 and said computer control unit 8 are able to operate on the basis of a presumption that marking of two points $T_o$ with two sets of $x_o$, $y_o$, $z_o$ coordinates on an obstacle should actually mean defining of a line between two points which corresponds to a top edge of said obstacle, which may then be presumed to be wedge-like body with a rectangular base plane x-y and triangular profile, wherein the shorter dimension of such assumed rectangular base is equal to the height $z_o$ of said body and the longer dimension thereof is equal to the distance between said two marked points. Also in such case, each distance between the gripping assembly 6 along or over said obstacle during transferring of each load can be determined in advance, which is either incorporated within the programming of said software, or a possibility is given that in each particular circumstances said distance is determined and manually input by a user. Additionally, said optical measuring unit 9 and said computer control unit 8 can also be suitable for defining of more than one obstacle and for marking of a plurality of points $T_o$ ($x_o$, $y_o$, $z_o$), which each per se may belong to separate or a particular obstacle.

In another embodiment, as shown in FIGS. 1-4, a camera 85 may be available in the area above the gripping assembly 6, which is together with optical measuring unit 9 and said computer control unit 8 adapted for operation in accordance with principles of computer vision, and in particular serves for recognition of objects, including recognition of orientation of a load which is to be transferred. Using such data, which may be retrieved from said camera 85, said computer control unit 8 is able to control, via said hydraulic control unit 71 of the hydraulic unit operation, desired operation of said gripping assembly 6, which means both controlling of rotation thereof around its vertical geometric axis 600 and also gripping or releasing of each transferred load. The present disclosure also provides that said computer control unit 8 for controlling said crane is suitable for operating, instead of in an orthogonal coordinate system x, y, z, as shown in FIGS. 3-4, in any other coordinate system. Coordinates in such other coordinate system may be mathematically transformable into coordinates of said orthogonal coordinate system x, y, z, or vice versa. Regarding the crane according to FIGS. 1-4 and by taking into consideration of movements and kinematics within each operation area, it appears to be quite useful, an alternative means for the computer control unit 8 to control such crane may include use of a cylindrical coordinate system, in which each point within a cylindrical space is defined with a radius, which defined its distance apart from the center of the coordinate system on its circular base plate, by angle at which it is rotated relative to a reference axis, as well as with a distance apart from said base plane along a line extending rectangular with regard to said base plane.

Said crane according to the present disclosure enables either manual or also computer-controlled gripping, transferring, and deposition of each solid load either in the form of a single piece having consistent stiffness and shape, or of a bundle of several such pieces, wherein said load may be transferred from each mathematically defined initial point $T_1$ towards each mathematically defined end point $T_2$, and each transferring of said load from said initial point $T_1$ towards each end point $T_2$ would have to be performed precisely and accurately, and in particularly also with the possibility of avoiding each potential collision with at least one obstacle $T_0$, which may be defined within a coordinate system between said initial point $T_1$ towards and said end point $T_2$.

What is claimed is:

1. A computer-controlled mobile crane, comprising:

a column, with a terminal portion which is faced towards the ground and rotates around a vertical geometric axis by a rotational hydraulic driving apparatus;

the column mounted on a platform mountable on a motor vehicle;

wherein the crane is furnished with supports for maintaining the motor vehicle in a secure position during its operation as well as for preventing the crane and also the motor vehicle from being overturned;

wherein the supports comprise at least two protruding telescopic beams with each of them on its free terminal portion equipped with an approximately vertical telescopic supporting leg which is via hydraulic conduits connected with a control unit of a hydraulic unit of the crane and is movable towards the ground, by which each beam can also be placed in a desired position;

a primary arm pivotally attached to said column at a terminal end faced away from the ground;

a secondary arm pivotally attached to said primary arm at the end of the primary arm opposite that of the column;

an attachment point suitable for attachment of a gripping assembly on a terminal portion of the secondary arm opposite that of the primary arm;

wherein the primary arm is capable of movement via a first hydraulic cylinder, which is attached to the column and to the primary arm, which is connected via first hydraulic conduits to the control unit of the hydraulic unit of the crane;

wherein the secondary arm is capable of movement via a second hydraulic cylinder, which is attached to the primary arm and the secondary arm, which is connected via second hydraulic conduits to the control unit of the hydraulic unit of the crane;

wherein movement of the column, the primary arm, the secondary arm, or the gripping assembly are enabled by the control unit of the hydraulic unit of the crane;

a computer control unit connected to the control unit of the hydraulic unit of the crane;

an optical measuring unit connected to the computer control unit capable of optically recognizing a point as marked by a light beam on a surface;

wherein the computer control unit is capable of generating a coordinate system in which the crane is located;

wherein the optical measuring unit is capable of determining of a distance between the optical measuring unit and one or more marked reference points within the coordinate system so that on the basis of a measured distance between the optical measuring unit and the one or more marked reference points the coordinates of the one or more marked reference points are mathematically determined;

a column sensor electrically connected to the computer control unit capable of determining a rotational position of the column within the coordinate system;

a primary arm sensor electrically connected to the computer control unit capable of determining a position of the primary arm within the coordinate system;

a secondary arm sensor electrically connected to the computer control unit capable of determining a position of the secondary arm within the coordinate system;

wherein the computer control unit comprises a software stored on an electronic storage medium which is capable to operate the crane and transfer a load within the coordinate system within which the crane is located by transferring the load from an initial point ($T_1$) to an end point ($T_2$);

wherein the optical measuring unit defines the initial point ($T_1$) where the load is located and the computer control unit calculates coordinates of the initial point ($T_1$) within the coordinate system (x, y z) based on the defining by the optical measuring unit;

wherein the optical measuring unit defines the end point ($T_2$) where the load is to be transferred and the computer control unit calculates coordinates of the end point ($T_2$) within the coordinate system (x, y z) based on the defining by the optical measuring unit;

wherein the optical measuring unit defines at least one intermediate point ($T_0$) on an obstacle to be avoided and the computer control unit is capable of calculating the coordinates of the at least one intermediate point ($T_0$) based on the defining by the optical measuring unit;

wherein the computer control unit determines the position of the column, primary arm, secondary arm, attachment point, and the gripping assembly within the coordinate system using the column sensor, primary arm sensor, and secondary arm sensor;

wherein, based on the of the initial point ($T_1$) and the calculated at least one intermediate point ($T_0$), the computer control unit calculates the necessary operation of the crane within the coordinate system to move the gripping assembly from a starting position towards the initial point ($T_1$) and pick up the load, wherein the computer control unit is capable of moving the gripping assembly to avoid the at least one intermediate point ($T_0$) on the obstacle located between the starting position and the initial point ($T_1$);

wherein, based on the calculated initial point ($T_1$), the calculated end point ($T_2$), and the calculated at least one intermediate point ($T_0$), the computer control unit calculates the necessary operation of the crane within the coordinate system to move the gripping assembly and the load from the initial point ($T_1$) towards the end point ($T_2$) and release the load, wherein the computer control unit is capable of moving the gripping assembly and the load to avoid the at least one intermediate point ($T_0$) on the obstacle located between the initial point ($T_1$) and the end point ($T_2$);

wherein the computer control unit displays information related to the calculations required to move the load between the starting position, the initial point ($T_1$), and the end point ($T_2$) to a user;

wherein upon receiving a command from the user, the computer control unit operates the crane within the coordinate system to move the gripping assembly from a starting position towards the initial point ($T_1$), pick up the load and move the gripping assembly and the load from the initial point ($T_1$) towards the end point ($T_2$) and release the load, wherein the computer control unit is capable of moving the gripping assembly and the load to avoid the at least one intermediate point ($T_0$) on the obstacle located between the starting position and the initial point ($T_1$), or between the initial point ($T_1$), and the end point ($T_2$);

wherein upon releasing the load, the computer control unit displays information related to the completed movement of the load between the initial point ($T_1$), and the end point ($T_2$) to the user.

2. The computer-controlled mobile crane according to claim 1, wherein the computer control unit is capable of determining the position of the column, primary arm, secondary arm, and gripping assembly in the coordinate system by storing and recalling in and from the electronic storage medium the last previously known position of the column, primary arm, secondary arm, and gripping assembly for use in calculating a movement of the load between a next initial point ($T_1$) and a next end point ($T_2$).

3. The computer-controlled mobile crane according to claim 1, wherein the optical measuring unit is mounted on a fixed and unchanging location on the crane.

4. The computer-controlled mobile crane according to claim 1, wherein the optical measuring unit is portable but is capable during operation of the crane of being in electronic communication with the computer control unit.

5. The computer-controlled mobile crane according to claim 1, wherein the computer control unit is programmed to calculate that the at least one intermediate point ($T_o$) represents a highest point or peak of a pyramid or conical shaped obstacle within the coordinate system.

6. The computer-controlled mobile crane according to claim 1, wherein the computer control unit is programmed to calculate the coordinates of at least two intermediate points ($T_0$) on the obstacle such that the at least two intermediate points ($T_o$) represent two points on a line between the at least two intermediate points which corresponds to a top edge of the obstacle.

7. The computer-controlled mobile crane according to claim 1, wherein the optical measuring unit and the computer control unit (8) are capable of defining a plurality of obstacles and marking a plurality of points ($T_o$) associated with the plurality of obstacles.

8. The computer-controlled mobile crane according to claim 1, further comprising a camera, which in conjunction with optical measuring unit and the computer control unit, is capable for recognition of objects, including recognition of the load which is to be transferred, wherein the computer control unit is capable of using data retrieved from the camera to further control the operation of the gripping assembly.

9. The computer-controlled mobile crane according to claim 1, wherein the coordinate system is an orthogonal (x, y, z) coordinate system.

10. The computer-controlled mobile crane according to claim 1, wherein the coordinate system is a cylindrical coordinate system.

11. The computer-controlled mobile crane according to claim 1, wherein the secondary arm may be comprised of two or more telescopic bearing sections which are capable of movement along the longitudinal axis of the secondary arm via a third hydraulic cylinder which is connected via third hydraulic conduits to the control unit of the hydraulic unit of the crane, wherein the attachment point is located on the outwardly protruding terminal portion of the innermost bearing section of the secondary arm.

12. The computer-controlled mobile crane according to claim 1, further comprising a hydraulic rotation unit between the attachment point on the free terminal portion of the secondary arm the gripping assembly, wherein the hydraulic rotation unit comprises a rotational hydraulic motor which is connected via hydraulic conduits connected to the control unit of the hydraulic unit of the crane and which is capable of rotation of the gripping assembly.

13. The computer-controlled mobile crane according to claim 11, further comprising a sensor capable to detect a position of the attachment point on the innermost bearing section within the coordinate system.

14. The computer-controlled mobile crane according to claim 12, further comprising a sensor capable to detect a rotational position of the gripping assembly which is attached to the hydraulic rotation unit within the coordinate system.

* * * * *